(12) United States Patent
Schweindl (10) Patent No.: US 10,889,032 B2
(45) Date of Patent: Jan. 12, 2021

(54) METHOD AND A DEVICE FOR PRODUCING A LAMINATED MOULDED PART

(71) Applicant: International Automotive Components Group GmbH, Duesseldorf (DE)

(72) Inventor: Fritz Schweindl, Muehldorf/Inn (DE)

(73) Assignee: INTERNATIONAL AUTOMOTIVE COMPONENTS GROUP GMBH, Dusseldorf (DE)

( * ) Notice: Subject to any disclaimer, the term of this patent is extended or adjusted under 35 U.S.C. 154(b) by 0 days.

(21) Appl. No.: 15/748,110

(22) PCT Filed: Jun. 20, 2016

(86) PCT No.: PCT/EP2016/064142
§ 371 (c)(1),
(2) Date: Jan. 26, 2018

(87) PCT Pub. No.: WO2017/016753
PCT Pub. Date: Feb. 2, 2017

(65) Prior Publication Data
US 2018/0215082 A1    Aug. 2, 2018

(30) Foreign Application Priority Data

Jul. 29, 2015 (DE) .......................... 10 2015 112 374

(51) Int. Cl.
*B29C 43/18* (2006.01)
*B29C 63/00* (2006.01)
(Continued)

(52) U.S. Cl.
CPC .......... *B29C 43/183* (2013.01); *B29C 33/424* (2013.01); *B29C 45/14008* (2013.01);
(Continued)

(58) Field of Classification Search
CPC ............ B29C 43/183; B29C 2043/147; B29C 2043/148; B29C 2045/0079; B29C 43/04;
(Continued)

(56) References Cited

U.S. PATENT DOCUMENTS 4,378,265 A * 3/1983 Kiss .......................... B27N 5/00
156/242
4,385,955 A   5/1983 Doerfling et al.
(Continued)

FOREIGN PATENT DOCUMENTS

AU    3157500 A    8/2007
CN    101394990 A    3/2009
(Continued)

OTHER PUBLICATIONS

Machine translation of European Patent Publication No. EP-0730947A2, originally published Mar. 6, 1996 (Year: 1996).*
(Continued)

*Primary Examiner* — Matthew J Daniels
*Assistant Examiner* — Andrew L Swanson
(74) *Attorney, Agent, or Firm* — Steven J. Grossman; Grossman Tucker Perreault & Pfleger, PLLC (57) ABSTRACT

A method for producing a laminated moulded part comprises a pressure moulding of a blank to form a moulded part in a moulding cavity between a first moulding tool unit and a second moulding tool unit, introducing of a laminating element into the moulding cavity after the pressure moulding of the blank, and a bonding of the moulded part with the laminating element in the moulding cavity.

7 Claims, 10 Drawing Sheets

(51) Int. Cl.
*B29C 69/00* (2006.01)
*B29C 33/42* (2006.01)
*B29C 45/14* (2006.01)
B29L 31/30 (2006.01)
B29C 45/00 (2006.01)

(52) U.S. Cl.
CPC .......... *B29C 63/0073* (2013.01); *B29C 69/00* (2013.01); *B29C 33/42* (2013.01); *B29C 45/14* (2013.01); *B29C 2043/185* (2013.01); *B29C 2043/186* (2013.01); *B29C 2045/0079* (2013.01); *B29C 2045/0093* (2013.01); *B29L 2031/3005* (2013.01); *B29L 2031/3041* (2013.01)

(58) Field of Classification Search
CPC ........ B29C 2043/043; B29C 2043/046; B29C 43/06–085
See application file for complete search history.

(56) References Cited

U.S. PATENT DOCUMENTS

| | | | |
|---|---|---|---|
| 5,756,406 A * | 5/1998 | Rittman | ................ B29C 43/183 442/117 |
| D602,309 S | 10/2009 | Pourounidis et al. | |
| 7,892,467 B2 | 2/2011 | Kofoed et al. | |
| 8,580,179 B2 | 11/2013 | Andersson | |

FOREIGN PATENT DOCUMENTS

| | | |
|---|---|---|
| CN | 101903153 A | 12/2010 |
| DE | 198 26 498 A1 | 12/1999 |
| DE | 10 2012 020 554 A1 | 4/2014 |
| DE | 10 2012 110 161 A1 | 4/2014 |
| EP | 0 543 085 A1 | 5/1993 |
| EP | 0 730 947 A2 | 9/1996 |
| EP | 2 457 706 A2 | 5/2012 |
| JP | 2008260203 A * | 10/2008 |

OTHER PUBLICATIONS

International Search Report and Written Opinion of the International Search Report issued in priority PCT/EP2016/064142, dated Sep. 6, 2016.
International Bureau of WIPO's English translation of the International Preliminary Report on Patentability issued in priority PCT/EP2016/064142, dated Feb. 1, 2018 (7 pgs).
Office Action dated Apr. 1, 2019 for corresponding Chinese application No. 201680043737.9 (6 pgs-non-english); The undersigned attorney notes any references cited in this Office Action that have not been included above in this instant IDS has previously been cited in an IDS tiled by applicant Jan. 26, 2018.

* cited by examiner

METHOD AND A DEVICE FOR PRODUCING A LAMINATED MOULDED PART

FIELD OF THE INVENTION

The invention relates to a method and a device for producing a laminated moulded part, in particular for producing a laminated non-woven fibre-reinforced supporting component for use in the interior trim of motor vehicles.

BACKGROUND OF THE INVENTION

Supporting elements, in particular for the interior trim of motor vehicles, are often pressed under heat in a pressure moulding tool. Stiffening ribs can optionally also be injected in the pressure moulding tool. In a subsequent production step the moulded part produced in this manner is then usually laminated on its upper face with a decorative element, such as a leather or fabric. For this purpose, the moulded part is removed from the moulding tool and fed to a separate, spatially separated, lamination facility.

The two-stage production process with temporally successive and spatially separate pressure moulding/injection moulding and lamination processes leads to high-quality laminated moulded parts, but is time-consuming and complex in terms of equipment. From time to time, therefore, experiments have been performed with manufacturing methods in which the decorative element is introduced together with the blank for the moulded part, as yet unmoulded, into the pressure tool, in order to combine the pressure moulding and lamination processes in one step. By virtue of the high pressure occurring during the pressure moulding process, however, the decorative element is often damaged. Particular difficulties arise in the use of hybrid tools, which also inject stiffening ribs in addition to the pressure moulding process. As a result of the high injection pressure, the decorative element is compressed, and the stiffening ribs are injected over the decorative element, so that they become undesirably visible on the decorative element.

The published patent application DE 198 26 498 A1 discloses a two-stage method for producing a laminated plastic moulded part for the interior trim of motor vehicles. In a first step, a plastic moulded part is formed by means of an injection moulding, transfer moulding or pressing method in a tooling mould. Subsequently, a decorative layer is inserted into the opened tool, wherein this decorative layer is wetted on the side facing the plastic part with an adhesive. The tooling is then closed without further additional heating, wherein the decorative layer is applied to the plastic moulded part. After cooling, the tooling is opened and the laminated plastic moulded part is removed from the tooling.

A method for producing a decorative part for a motor vehicle interior in a pressure tool, in which one mould half of the pressure moulding tool is changed between the formation of the decorative layer and the introduction of a fibre composite material, is of known art from the published patent application DE 10 2012 110 161 A1.

There is therefore a need for an improved method and an improved device with which a laminated moulded part can be produced quickly, efficiently and with high quality.

OVERVIEW OF THE INVENTION

This objective is achieved by a method and a device for producing a laminated moulded part with the features as claimed.

A method for producing a laminated moulded part in accordance with the present invention features the pressure moulding of a blank to form a moulded part in a moulding cavity between a first moulding tool unit and a second moulding tool unit, introducing a laminating element into the moulding cavity after pressure moulding the blank, and bonding the moulded part with the laminating element in the moulding cavity.

In accordance with the invention, therefore, the lamination of the moulded part takes place in a separate process step after the pressure moulding, but in the same moulding cavity or tool. As a result several advantages ensue: the processing speed increases, since the steps of removing the pressure moulded part from the pressure mould, transporting it to a separate lamination facility, and clamping it in the lamination facility, are omitted. At the same time, the amount of equipment and space required for production decrease, since it is possible to dispense with a separate lamination facility. Overall, the production method thereby becomes faster and more efficient. In addition, the residual heat in the pressure moulding tool can be used for the subsequent lamination process.

In a pressure moulding tool device, the blank, for example a thermoplastically bonded non-woven fabric, can be introduced into a moulding cavity between the first moulding tool unit and the second moulding tool unit. In the context of the invention the moulding cavity can be understood as a cavity for receiving the blank and for pressure moulding the blank to form a moulded part. In particular, the moulding cavity can be a space between the first moulding tool unit and the second moulding tool unit, or can comprise this space.

The first moulding tool unit and the second moulding tool unit can be displaced, or can move relative to each other in the moulding cavity. Here the first moulding tool unit can be designed to be movable, and the second moulding tool unit can be designed to be fixed in space, or vice versa. Likewise, both the first moulding tool unit and the second moulding tool unit can be designed such that they can move, and can be moved against one another during the pressure moulding process.

A shape and/or structure of a first surface of the first moulding tool unit and/or a shape or structure of a second surface of the second moulding tool unit are matched to the shape or structure of the moulded part to be produced, and impress the corresponding structure onto the blank during the pressure moulding process. Here the second surface of the second moulding tool unit preferably faces the first surface of the first moulding tool unit. In this manner a tooling gap can be formed between the first surface of the first moulding tool unit and the second surface of the second moulding tool unit, which gap is reduced to a predetermined gap distance during the pressure moulding process by a movement of the first moulding tool unit relative to the second moulding tool unit, so that the blank located in between them is pressed to form the moulding with the desired surface shape and/or surface structure.

In contrast to the prior art, the moulded part, after the pressure moulding process, does not necessarily have to be removed from the pressure moulding tool device or the moulding cavity for purposes of lamination. Rather, in accordance with the invention, between the pressure moulding process and the introduction of the laminating element, that is to say, between the pressure moulding process and the bonding of the moulded part with the laminating element, the moulded part can remain in the moulding cavity. In particular, the moulded part, after the pressure moulding process, can remain attached to or adhering to the first moulding tool unit in the moulding cavity. By this means the time-consuming removal of the pressure moulded blank from the pressure moulding tool device and its transport to a separate lamination facility is eliminated.

In a preferred embodiment, the bonding of the moulded part with the laminating element comprises a pressure lamination of the moulded part with the laminating element in the moulding cavity. In this manner, the existing pressure moulding tool device can also be used as a lamination facility.

The bonding of the moulded part with the laminating element preferably features a pressure lamination of the moulded part with the laminating element between the first moulding tool unit and the second moulding tool unit.

In accordance with this embodiment, the first moulding tool unit and the second moulding tool unit can be used immediately after the pressure moulding process and in a subsequent process step for purposes of pressure lamination. The expenditure on equipment and set-up times are thereby minimised.

In particular, the pressure lamination may feature an adjustment of a gap dimension between the first moulding tool unit and the second moulding tool unit. In particular, the gap dimension for the pressure lamination can be set to be larger than the corresponding gap dimension during the pressure moulding of the blank.

In this embodiment, the first moulding tool unit and the second moulding tool unit of the pressure moulding process can be used in a subsequent process step for purposes of pressure lamination without any structural alterations. An adjustment is made purely by an alteration of the gap dimension and/or, if required, by an alteration of the contact pressure.

In alternative embodiments, however, a specially adapted moulding tool unit can be used for the subsequent pressure lamination process. For example, after the pressure moulding process, the pressure moulded part can remain attached to the first moulding tool unit in the moulding cavity, while the second moulding tool unit is being exchanged for a third moulding tool unit for the pressure lamination.

A shape and/or surface structure of the third moulding tool can be matched to the laminating element. These embodiments are particularly advantageous for moulded parts with a pronounced three-dimensional surface structure.

The bonding of the moulded part with the laminating element can also comprise a pressure lamination of the moulded part with the laminating element between the first moulding tool unit and a third moulding tool unit, which differs from the second moulding tool unit.

In a further development, the method may comprise the removal of the second moulding tool unit from the moulding cavity after the pressure moulding process.

The method can also include a step of introducing the third moulding tool unit into the moulding cavity, after the pressure moulding process and before the pressure lamination process, so that the third moulding tool unit faces the second moulding tool unit.

In particular, a shape and/or structure of the laminated moulded part can be defined by a shape or structure of a third surface of the third moulding tool unit, wherein the third surface of the third moulding tool unit preferably faces the first surface of the first moulding tool unit.

In a further development, the laminating element can be introduced into the moulding cavity on the third moulding tool unit before the pressure lamination process. In this manner the third moulding tool unit can serve at the same time as a transport element for the laminating element. A separate transport element for purposes of introducing the laminating element is therefore unnecessary. The method efficiency is thereby further increased.

The inventive method can preferably comprise a step of attachment of the laminating element to the second or third moulding tool unit before the bonding of the moulded part with the laminating element. The attachment can be advantageous both in terms of transporting the laminating element and also in terms of positioning the laminating element before the bonding of the moulded part with the laminating element.

In particular the method can comprise a step of sucking the laminating element onto the second or third moulding tool unit. By means of suction, a laminating element, for example a laminating film, can be reliably transported, and quickly and accurately positioned.

In a preferred embodiment, the blank is a preheated blank. In particular, the inventive method may comprise a step of preheating the blank.

A preheated blank can be pressure moulded more effectively, and has a greater form stability after it has cooled.

The residual heat of the blank or first moulding tool unit and of the second moulding tool unit in the moulding cavity can also be used in accordance with the invention for the subsequent bonding of the moulded part with the laminating element. The lamination process is also preferably carried out with the input of heat. The laminating element on a lower face, can, for example, feature an adhesive for purposes of bonding with the moulded part. This adhesive can be activated by the input of heat.

Since the bonding of the moulded part with the laminating element takes place in the moulding cavity that has been preheated in the course of the pressure moulding process, the residual heat can also be used for the subsequent lamination process. The energy efficiency of the production method is thereby increased.

Separate heating of the laminating element prior to the bonding of the moulded part with the laminating element can therefore be dispensed with in some embodiments.

In other embodiments additional heating of the laminating element prior to the bonding of the moulded part with the laminating element can be advantageous in terms of aiding the lamination process. In this case, however, by virtue of the residual heat in the moulding cavity, the input of heat necessary for heating the laminating element is reduced.

The inventive method can also comprise a step of introducing the blank into the moulding cavity.

In a preferred embodiment, the method comprises a step of an injection of reinforcing or stiffening elements onto the moulded part in the moulding cavity.

The injection of reinforcing elements can take place in a hybrid process at the same time as the pressure moulding of the blank to form the moulded part. By this means the process efficiency is further increased.

In the context of the invention, any structural element can be understood to be a moulded part that can be formed from a blank by a pressure moulding process. In particular the moulded part can be a supporting moulded part.

In the context of the invention, any raw material can be understood to provide the blank for the pressure moulding process.

In preferred forms of embodiment, the blank features a thermoplastically bonded non-woven fabric. The non-woven fabric can feature natural fibres, glass fibres, PET fibres, carbon fibres and/or cotton fibres.

In the context of the invention any element with which a moulded part can be bonded can be understood to be the laminating element in a lamination process.

The laminating element can feature a decorative element and/or a film, in particular a decorative film, Decorative films can, in particular, comprise PVC, polyolefin (TPO), PU, PC and/or PMMA, with or without foam or non-woven fabric laminations. The decorative elements can, in particular, feature leather, alcantara, artificial leather, non-woven fabrics, or carpets.

The bonding of the moulded part with the laminating element may comprise adhesive bonding. In particular, reactive or thermoplastic adhesive systems can be used to assist the bonding of the moulded part with the laminating element.

The invention also concerns a control program with computer-readable instructions, which are set up to execute a method with one or all of the above-cited features when processing the computer-readable instructions in a computer device.

The invention also concerns a storage medium with computer-readable instructions, which are set up to execute a method with one or all of the above-cited features when processing the computer-readable instructions in a computer device.

The invention also concerns a device for producing a laminated moulded part using a pressure moulding tool device, comprising a first moulding tool unit and a second moulding tool unit and a moulding cavity, wherein the first moulding tool unit and the second moulding tool unit can be displaced relative to each other in the moulding cavity for purposes of pressure moulding a blank to form a moulded part. The inventive device further comprises a first insertion device for introducing a laminating element into the moulding cavity after the pressure moulding of the moulded part. In accordance with the invention, the device is equipped for the purpose of bonding the moulded part with the laminating element in the moulding cavity.

In particular the device can be equipped for the purpose of allowing the moulded part to remain in the moulding cavity between the pressure moulding process and the introduction of the laminating element, or between the pressure moulding process and the bonding of the moulded part with the laminating element, preferably attached or adhering to the first moulding tool unit.

The pressure moulding tool device is preferably equipped for pressure laminating the moulded part with the laminating element in the moulding cavity.

In an embodiment the pressure moulding tool device is equipped for pressure laminating the moulded part with the laminating element in the moulding cavity between the first moulding tool unit and the second moulding tool unit.

In an inventive development, the pressure moulding tool device is equipped for setting a gap dimension between the first moulding tool unit and the second moulding tool unit, in particular for setting a gap dimension that is larger than a corresponding gap dimension during the pressure moulding of the blank.

The pressure moulding tool device can also comprise a third moulding tool unit, wherein the third moulding tool unit and the first moulding tool unit can be displaced relative to each other in the moulding cavity, wherein the pressure moulding tool device is equipped for pressure laminating the moulded part with the laminating member in the moulding cavity between the first moulding tool unit and the second moulding tool unit.

The pressure moulding tool device can be equipped for removing the second moulding tool unit from the moulding cavity, and/or introducing the third moulding tool unit into the moulding cavity.

In particular the pressure moulding tool device can be equipped for positioning the third moulding tool unit such that it faces the first moulding tool unit in the moulding cavity.

The second moulding tool unit or the third moulding tool unit can be equipped for, prior to bonding the moulded part with the laminating element, attaching the laminating element onto the second moulding tool unit or the third moulding tool unit, in particular using a deep drawing process and preferably with the application of suction.

For this purpose the second or third moulding tool unit can be designed with a suction device.

In an embodiment, the device also features a second insertion device for purposes of introducing the blank into the moulding cavity.

The device preferably comprises a heating device for heating the blank and/or for heating the laminating element before bonding the moulded part with the laminating element.

The pressure moulding tool device can be equipped for the injecting reinforcing elements onto the moulded part in the moulding cavity.

DESCRIPTION OF PREFERRED EMBODIMENTS

The advantages of the method in accordance with the invention and of the device in accordance with the invention can best be understood from the following detailed description of embodiments with reference to the drawings, in which.

The invention will be explained below with reference to examples of embodiment, which relate to the production of non-woven fabric-reinforced supporting components for the automotive interior. However, the invention is not limited to these applications, but is generally applicable to methods for producing a laminated moulded part comprising a step of pressure moulding a blank to form a moulded part and a subsequent step of bonding the moulded part with a laminating element using, for example, an adhesive.

Figure 1A:
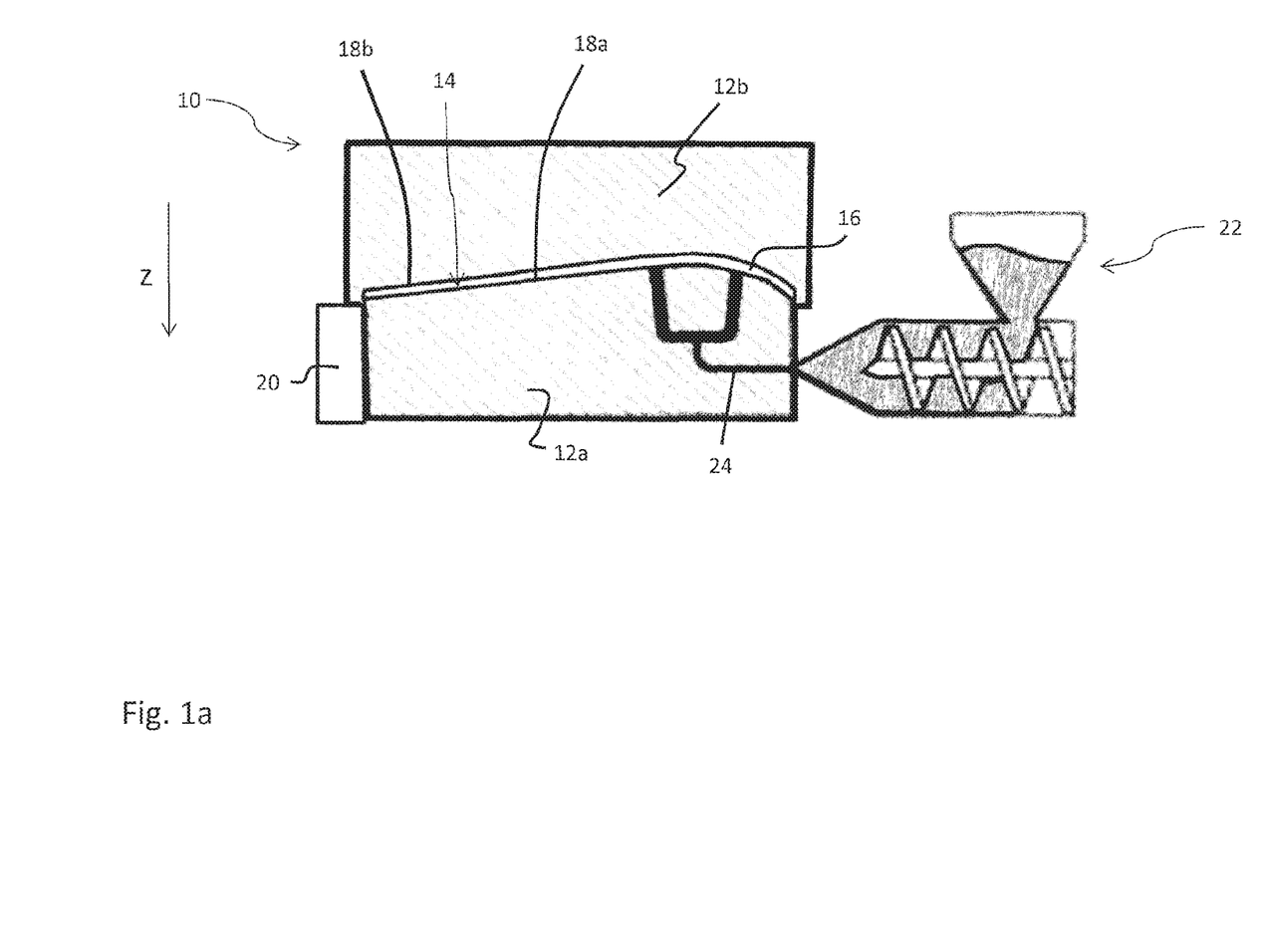
FIGS. 1a to 1c schematically illustrate the process steps of a method for producing a laminated moulded part in accordance with a first embodiment of the invention.
Figure 1B:
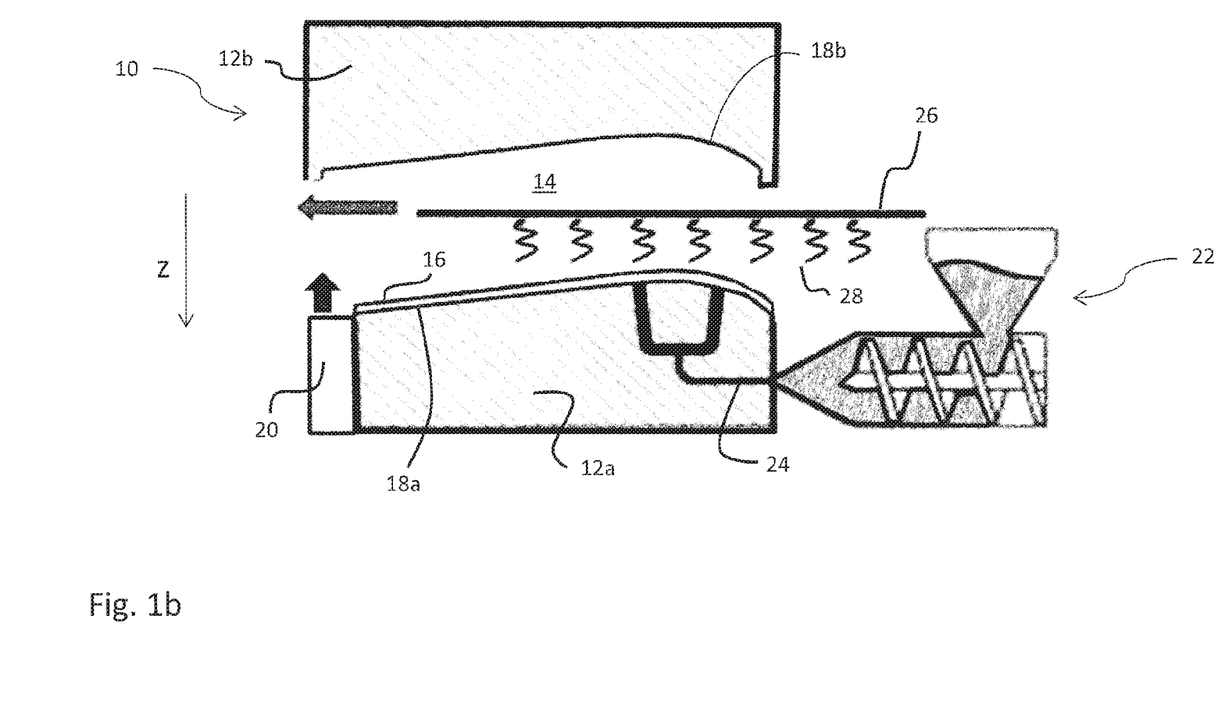
Figure 1C:
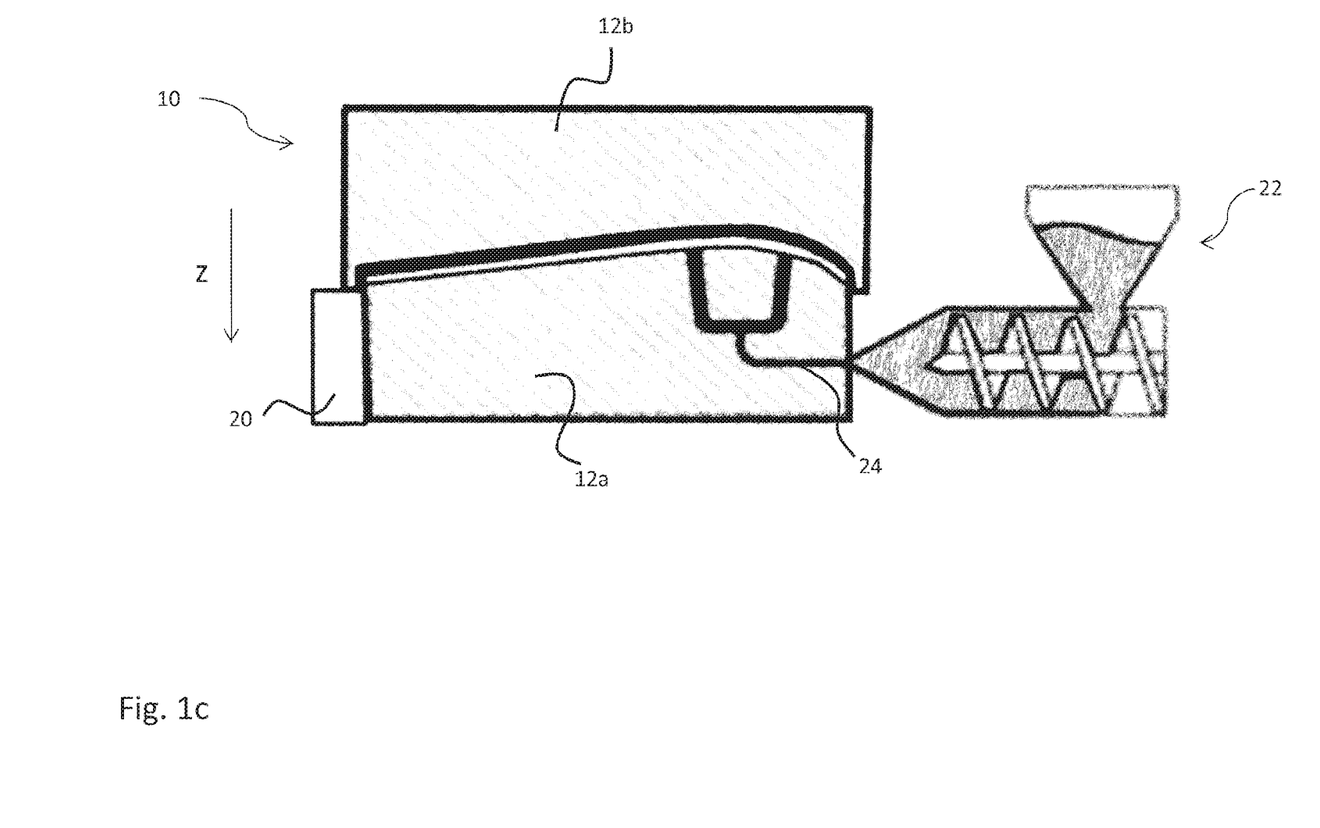

FIGS. 1a to 1c schematically illustrate the process steps of a method for producing a laminated moulded part in accordance with a first embodiment of the invention.

FIG. 1a shows, in a schematic side view, a pressure moulding tool device 10, which comprises a first moulding tool unit 12a and a second moulding tool unit 12b. In the representation of FIG. 1a the first moulding tool unit 12a is designed as a lower tool that is fixed in space. The second moulding tool unit 12b is designed as an upper tool, and is mounted such that it can move or be displaced along the direction z relative to the first moulding tool unit 12a.

However, this embodiment is purely exemplary. In other embodiments, the second moulding tool unit 12b can be fixed in space and the first moulding tool unit 12a can be mounted such that it can move. Likewise, both the first moulding tool unit 12a and the second moulding tool unit 12b can be mounted such that they can move or be displaced relative to one another.

The pressure moulding tool device 10 also comprises a moulding cavity 14, which receives a blank for purposes of pressure moulding, and in which the blank is pressed between the first moulding tool unit 12a and the second moulding tool unit 12b to form a moulded part 16. The moulding cavity 14 is formed as a tooling gap with a variable gap dimension between an upper first surface 18a of the first moulding tool unit 12a and a lower second surface 18b of the second moulding tool unit 12b. The first surface 18a of the first moulding tool unit 12a and the second surface 18b of the second moulding tool unit 12b are matched in shape and structure, in particular are complementary to each other, and determine the shape and surface structure of the press moulded part 16.

For purposes of pressure moulding, a blank, for example a thermoplastically bonded fibrous non-woven fabric mat, is introduced into the moulding cavity 14 by means of an insertion device (not shown in FIG. 1a). The blank can be preheated prior to introduction into the moulding cavity 14 in a heater (not shown), so as to ease the pressure moulding process and to enable consistent shaping. After introducing the blank, the second moulding tool unit 12b is lowered under pressure against the first moulding tool unit 12a along the direction z. The final position after lowering is shown in FIG. 1a and is determined by an adjustable stop element 20, which is adjustably connected to the first moulding tool unit and against which the second moulding tool unit 12b abuts when lowering is complete. In this tool position, the blank is compressed between the first moulding tool unit 12a and the second moulding tool unit 12b, and is formed into the moulded part 16 by contact with the first surface 18a of the first moulding tool unit 12a and the second surface 18b of the second moulding tool unit 12b.

During the pressure moulding process in the pressure moulding tool device 10, injection moulding of parts of the moulded part 16 can also take place on the rear face of the moulded part 16 to form a reinforcing structure, for example a ribbed structure. To this end, the pressure moulding tool device 10 features an injection moulding unit 22, which selectively applies a liquefied plastic agent under high pressure to predetermined regions of the rear face of the moulded part 16 via injection moulding channels 24 formed in the first moulding tool unit 12a, while the tool for pressure moulding is closed.

Alternatively or additionally, trimming of the moulded part 16 can also take place in or after this process step.

Subsequently, the moulding tool is opened and the moulded part 16 is released, in that the second moulding tool unit 12b is moved back along the −z-direction. The open state of the pressure moulding tool device 10 is shown in FIG. 1b.

After the pressure moulding tool device 10 has been opened, the moulded part 16 rests on the first surface 18a of the first moulding tool unit 12a, or adheres to the first surface 18a. By means of an insertion device (not shown), a laminating element 26, for example a leather film web or a fabric film web, is then introduced into the moulding cavity 14 between the first moulding tool unit 12a and the second moulding tool unit 12b (illustrated by an arrow in FIG. 1b). The laminating element 26 is coated on its rear face, facing the moulded part 16, with an adhesive 28, for example a reactive or thermoplastic adhesive system.

After the introduction of the laminating element 26 into the moulding cavity 14, the second moulding tool unit 12b is lowered again along the direction z until the second surface 18b of the second moulding tool unit 12b presses the laminating element 26 against the upper face of the moulded part 16. The final position can be adjusted by varying the adjustable stop element 20. For example, the movable stop element 20 can be moved along the −z-direction so as to enlarge the tooling gap 14 between the first moulding tool unit 12a and the second moulding tool unit 12b relative to that in the pressure moulding process of FIG. 1a. In this manner, the tooling gap 14 can be matched to a material thickness of the laminating element 26 additionally introduced for the pressure lamination process. The contact pressure can also be varied as required.

The closed state of the pressure moulding tool device 10 is shown schematically in FIG. 1c. In this configuration, a pressure lamination of the moulded part 16 with the laminating element 26 takes place. In this step, the moulded part 16 and the laminating element 26 can also be further trimmed.

After the reopening of the pressure moulding tool device 10, the laminated moulded part can be removed from the moulding cavity 14.

An advantage of the embodiment described above compared with conventional methods for producing a laminated moulded part is that the pressure moulding of the blank to form a moulded part 16 and the lamination of the moulded part 16 with the laminating element 26 take place in the same pressure moulding tool device 10 and in the same moulding cavity 14. In particular, after the pressure moulding process, the pressure moulded part 16 remains attached to the first moulding tool unit in the moulding cavity 14. Removal of the pressure moulded part 16 from the pressure moulding tool device 10 prior to the step of lamination, and transportation of the moulded part 16 to a separate lamination device, becomes unnecessary. By this means the process efficiency is increased. At the same time the space requirement decreases, because a separate lamination device can be dispensed with.

Another advantage ensues from the use of the residual heat from the pressure moulding process in the subsequent pressure lamination process. For the pressure moulding process, the blank, for example, a thermoplastically bonded non-woven fabric, is usually heated to temperatures in excess of 200° C. After the pressure moulding process, the moulded part 16 remaining in the moulding cavity 16 is still significantly heated. Depending on the embodiment and the duration of the pressing operation, it can still have temperatures of more than 100° C. after the pressure moulding process. This residual heat can be used to activate the adhesive 28 in the subsequent lamination process. Therefore, compared with conventional production methods with a spatially separate lamination process, heating of the laminating element 26 prior to lamination can be completely, or at least largely, dispensed with.

In the embodiment of FIGS. 1a to 1c, the pressure lamination process is carried out with the same moulding tool units 12a and 12b as the preceding pressure moulding process. In contrast, FIGS. 2a to 2c show an alternative embodiment in which the second moulding tool unit 12b for the pressure lamination process is exchanged for a third moulding tool unit 12c.

Figure 2A:
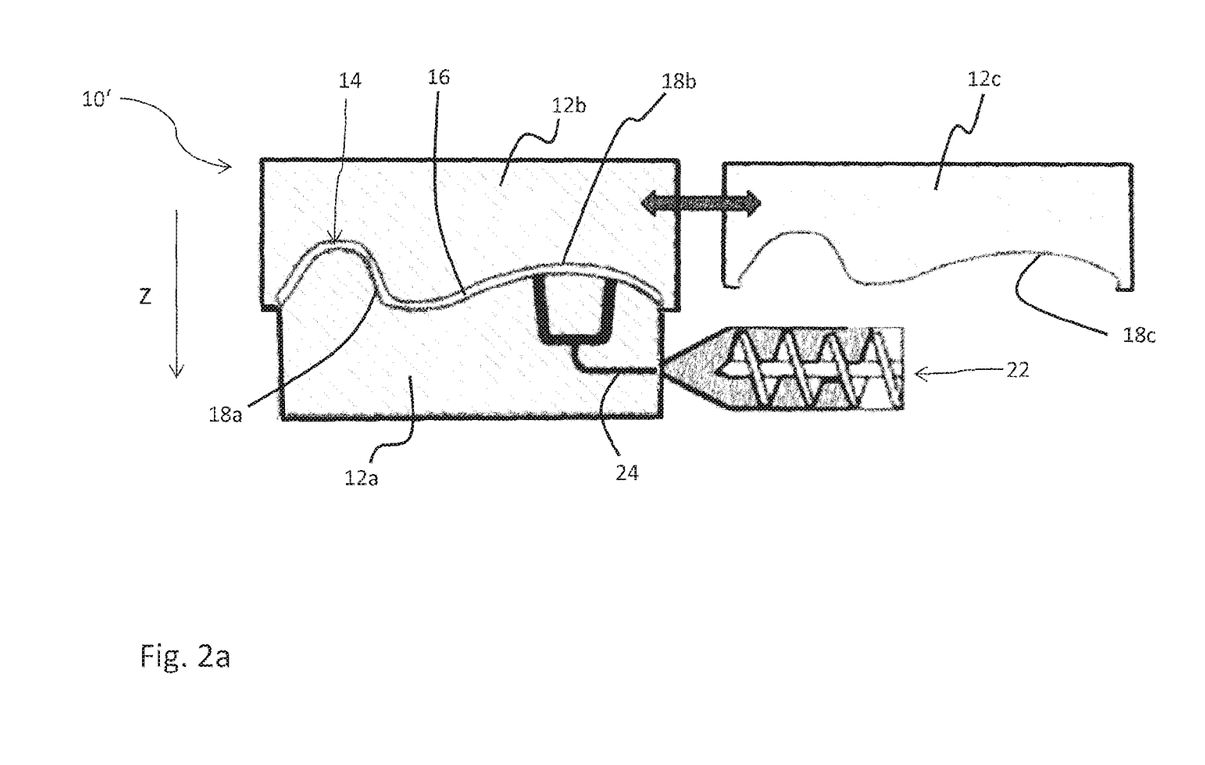
FIGS. 2a to 2c schematically illustrate the process steps of a method for producing a laminated moulded part in accordance with a second embodiment of the invention.

The construction of the pressure moulding tool device 10' of FIGS. 2a to 2c largely corresponds to that of the pressure moulding tool device 10 of the first embodiment. In particular, the pressure moulding of the blank shown in FIG. 2a to form a moulded part 16 as described with reference to FIG. 1a above for the first embodiment takes place between the first moulding tool unit 12a and the second moulding tool unit 12b.

Subsequent to the opening of the pressure moulding tool device 10', the moulded part 16 remains attached to the first surface 18a of the first moulding tool unit 12a in the moulding cavity 14. As described above with reference to FIG. 1b, the laminating element 26 is subsequently introduced into the moulding cavity 14.

Figure 2B:
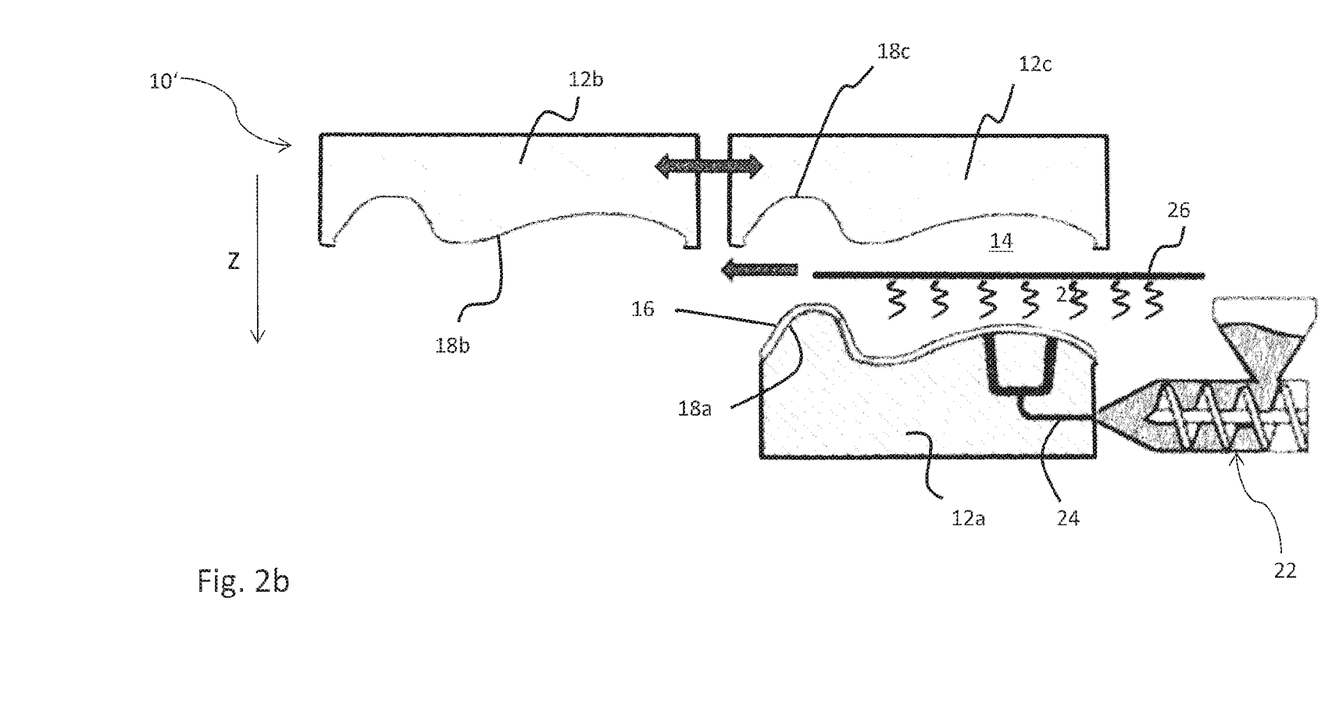
Figure 2C:
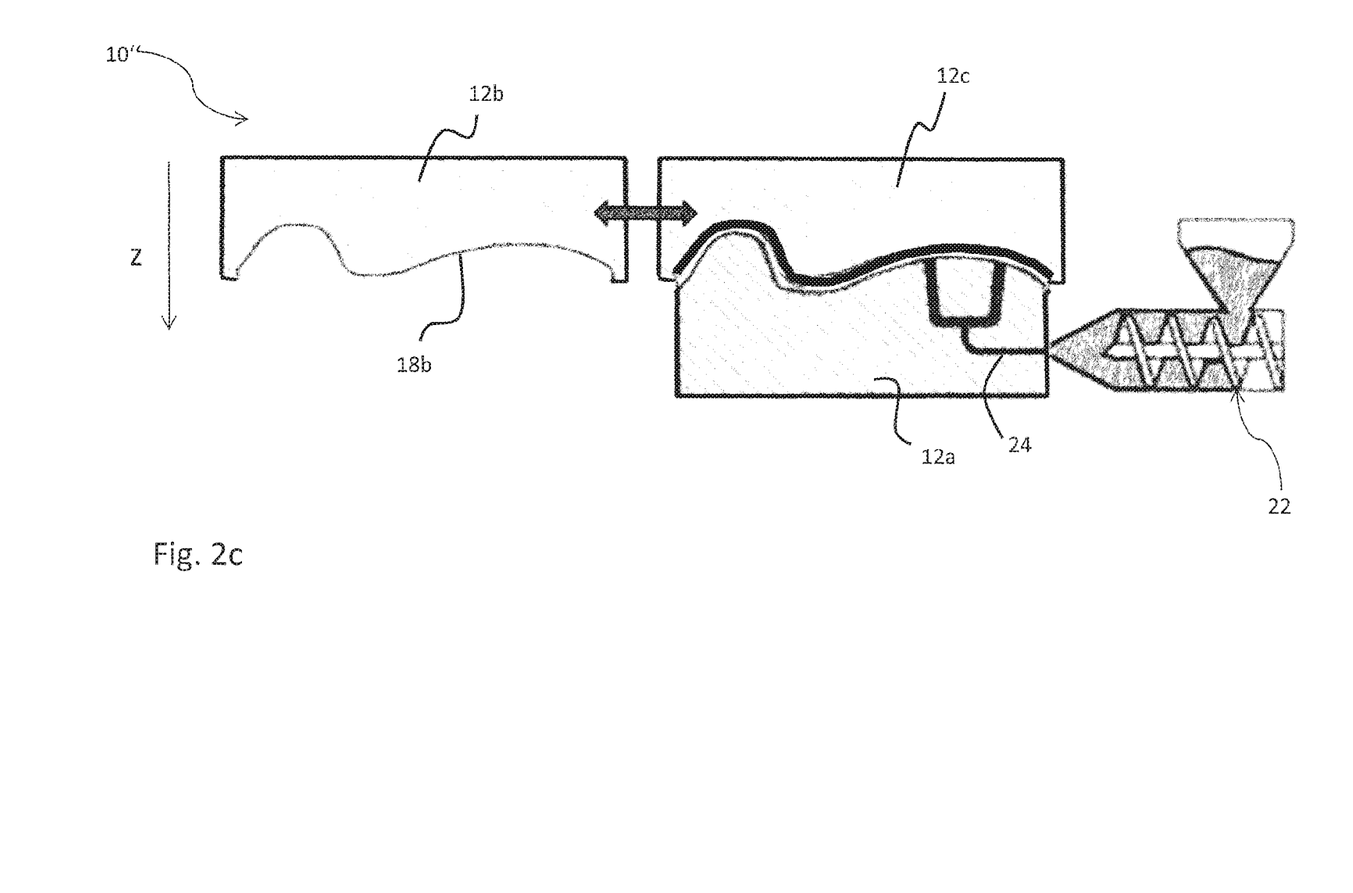

As is shown in FIG. 2b, however, in contrast to the first form of embodiment, the second moulding tool unit 12b is removed from the moulding cavity 14 and in its place a third moulding tool unit 12c is positioned opposite the first moulding tool unit 12a in the moulding cavity 14. The replacement of the second moulding tool unit 12b with the third moulding tool unit 12c can be performed by using a moulding tool changeover device (not shown). The third moulding tool unit 12c comprises on its lower face a third surface 18c, with which it presses the laminating element 26 against the moulded part 16 during the subsequent lowering. By this means, the moulded part 16 is pressure-laminated on its upper face with the laminating element 26, as is shown in FIG. 2c.

The third surface 18c of the third moulding tool unit 12c may be configured in shape and structure in a basically similar manner to the second surface 18b of the second moulding tool unit 12b, but may be set back by a thickness of the laminating element 26. This embodiment is particularly advantageous for the production of mould elements with a pronounced surface structure in the z-direction.

In addition, the third surface 18c of the third moulding tool unit 12c may comprise structural elements for purposes of patterning the surface of the laminating element 26 during pressure lamination, for example, moulded surface sections or protruding inserts. In this manner, a surface structure can be additionally impressed onto the laminating element 26 during the pressure lamination process.

A third embodiment of a method for producing a laminated moulded part will be described below with reference to FIGS. 3a to 3b.

The third embodiment is largely similar to the second embodiment and comprises a pressure moulding tool device 10" with a changeover device for replacing the second moulding tool unit 12b with a third moulding tool unit 12c'. The third moulding tool unit 12c' corresponds essentially in function and configuration to the third moulding tool unit 12c described above with reference to the second embodiment. However, it comprises in addition a suction device for applying suction to the laminating element 26. The third moulding tool unit 12c' can, for example, be provided on its lower third surface 18c' with a plurality of openings that are connected to a vacuum source (not shown) via channels extending within the third moulding tool unit 12c'. By applying a reduced pressure by means of the vacuum source, the laminating element 26 can be sucked onto the third surface 18c' and deep-drawn, so that it corresponds in shape to the shape and structure of the third surface 18c'. FIG. 3b shows the deep-drawn laminating element 26 on the third surface 18c'.

The deep drawing ensures on the one hand a precise and reproducible positioning of the laminating element 26 in the moulding cavity 14. In addition, this embodiment makes it possible to introduce the laminating element 26 together with the third moulding tool unit 12c' into the moulding cavity 14, as is shown schematically in FIG. 3b. In this embodiment, the insertion device for purposes of introducing the laminating element comprises the third moulding tool unit 12c'. A separate insertion device for the laminating element 26 can be dispensed with.

Figure 3A:
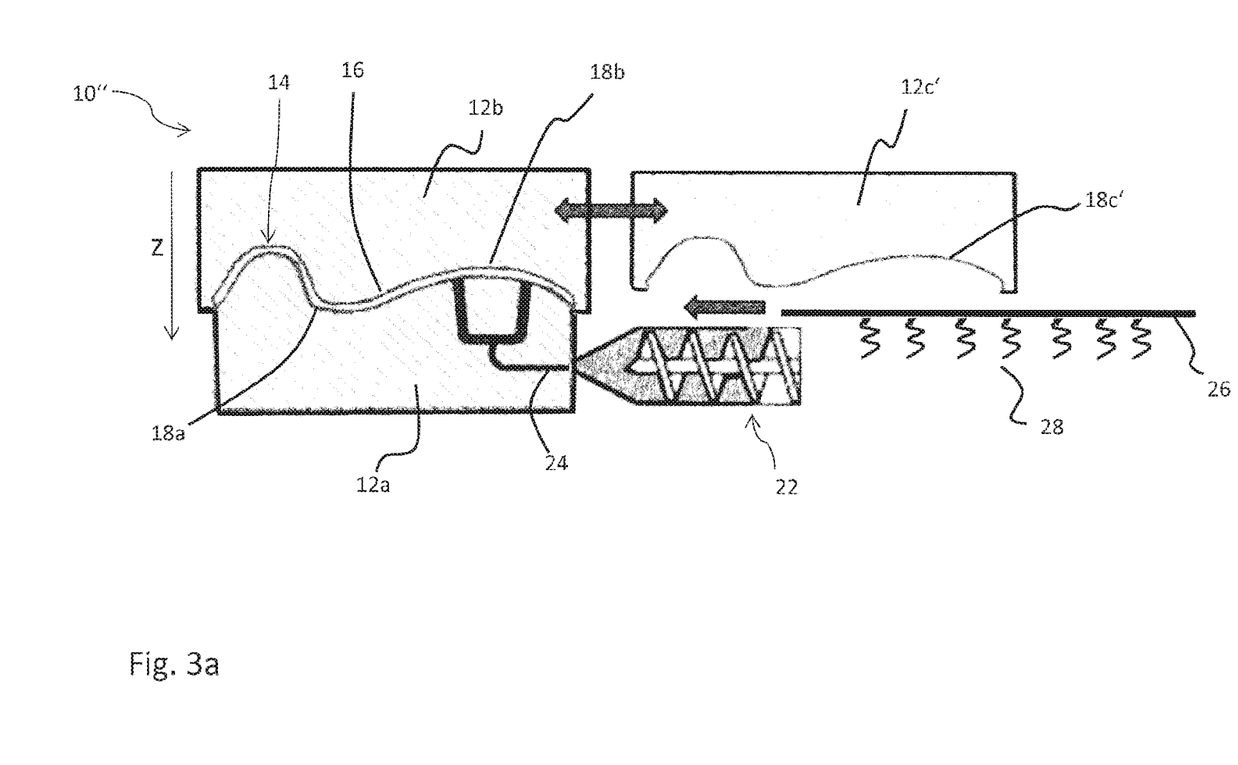
FIGS. 3a to 3c schematically illustrate the process steps of a method for producing a laminated moulded part in accordance with a third embodiment of the invention.
Figure 3B:
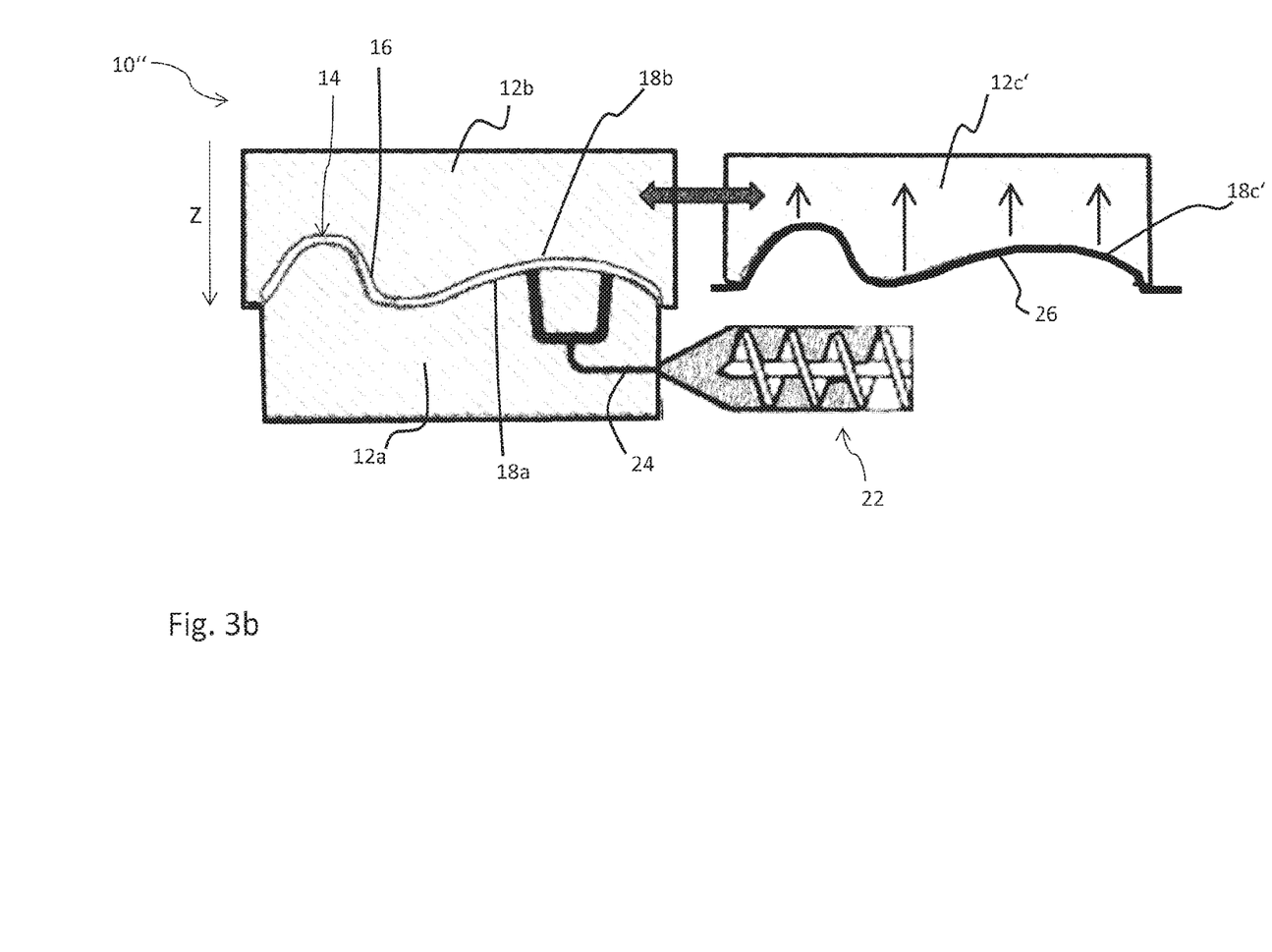
Figure 3C:
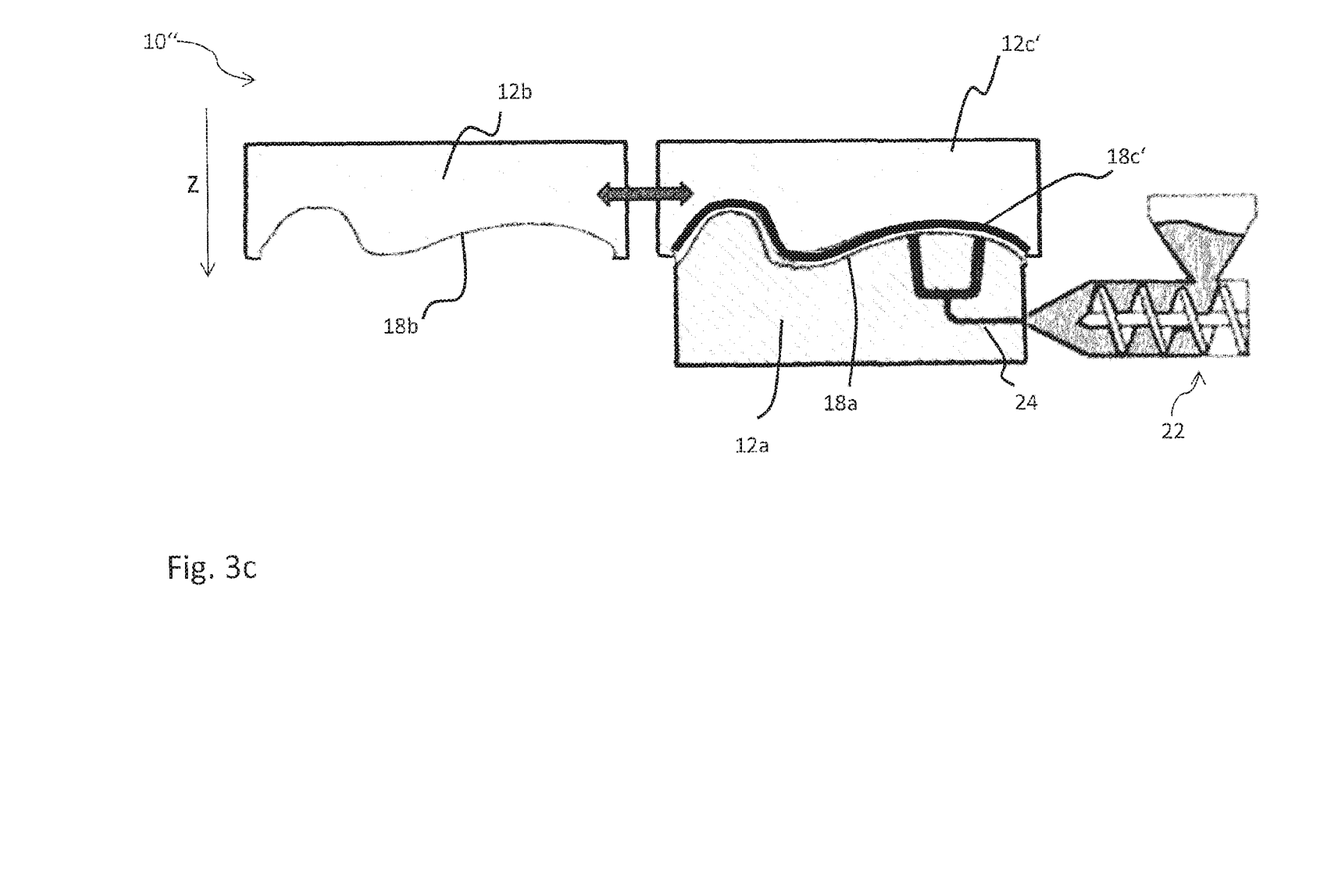

Apart from these differences, the production of the laminated moulded part in accordance with the example of embodiment of FIGS. 3a to 3b takes place completely in accordance with the second embodiment described above with reference to FIGS. 2a to 2c.

Figure 4:
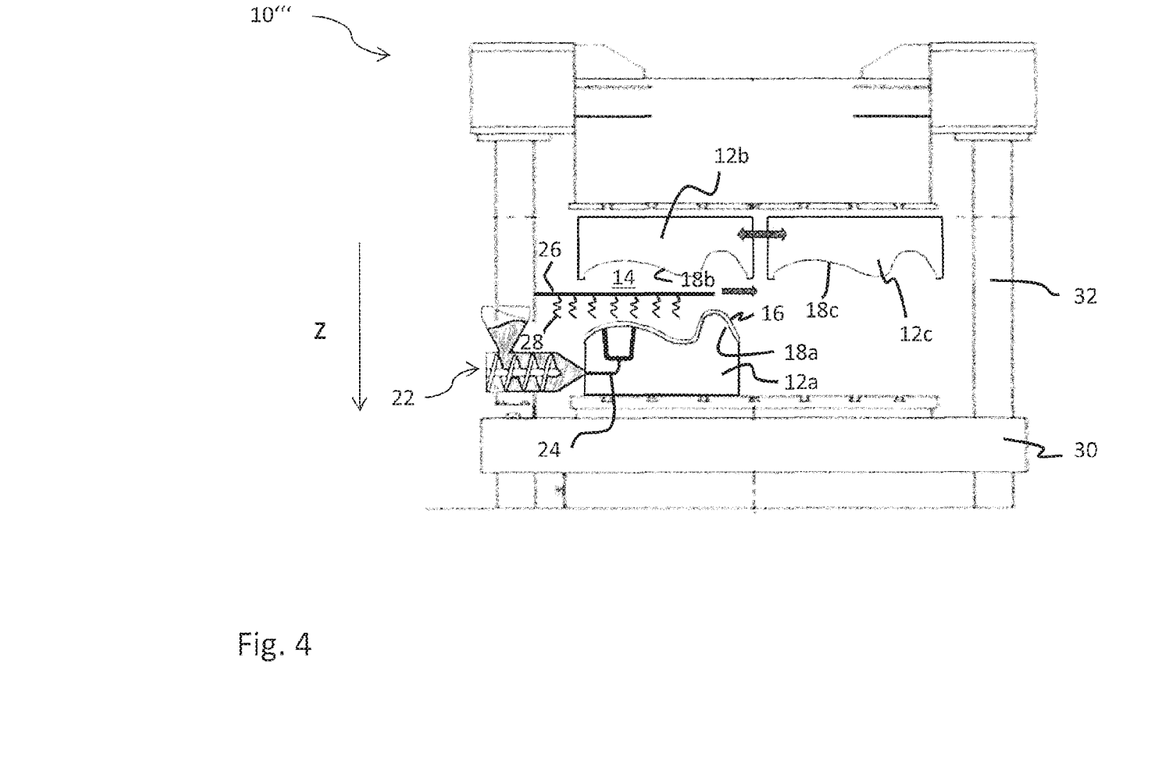
FIG. 4 shows schematically a device for producing a laminated moulded part in accordance with an embodiment of the invention.

FIG. 4 shows an embodiment of a pressure moulding tool device 10''' in further detail. The pressure moulding tool device 10''' comprises a base element 30 on which the first moulding tool unit 12a is mounted. The base element 30 also supports the injection moulding unit 22, which can inject a plastic injection agent into the moulding cavity 14 by way of injection moulding channels 24 formed in the first moulding tool unit 12a, as described above with reference to the first embodiment.

The pressure moulding tool device 10''' further comprises a portal device 32, on which the second moulding tool unit 12b is mounted such that it can be moved. The portal device 32 enables lowering of the second moulding tool unit 12b along the direction z relative to the first moulding tool unit 12a for the pressure forming process and the subsequent pressure lamination process, as described in detail above with reference to the first to third embodiments. The portal device 32 also allows the exchange of the second moulding tool unit 12b for the third moulding tool unit 12c, so that the pressure moulding process and the subsequent pressure lamination process can take place with different moulding tools, as previously explained in more detail with reference to the second embodiment.

The examples of embodiments and the drawings serve only to illustrate the invention and the advantages associated with it, but are not intended to limit the invention. The scope of the invention is defined solely from the following claims.

What is claimed is:

1. A method for producing a laminated moulded part, comprising steps of:
   pressure moulding a blank to form a moulded part in a moulding cavity between a first moulding tool unit and a second moulding tool unit, wherein the moulded part is pressure moulded from the blank being provided as a fibrous non-woven fabric mat;
   delivering a plastic from an injection moulding unit to the first moulding tool unit through an injection moulding channel of the first moulding tool unit;
   injection moulding the plastic delivered from the injection moulding unit to the first moulding tool unit onto a rear face of the moulded part in at least one localized region of the moulded part;
   introducing a laminating film into the moulding cavity after the pressure moulding of the blank and the injection moulding of the at least one localized region;
   bonding the laminating film to a front face of the moulded part in the moulding cavity; and
   wherein the bonding of the moulded part with the laminating film comprises a pressure laminating of the moulded part with the laminating film in the moulding cavity between the first moulding tool unit and a third moulding tool unit, wherein a moulding surface of the third moulding tool unit is set back by a thickness of the laminating film relative to a moulding surface of the second moulding tool unit.

2. The method in accordance with claim 1,
wherein the moulded part remains in the moulding cavity between the pressure moulding, and the introducing of the laminating film, and the bonding of the moulded part with the laminating film.

3. The method in accordance with claim 1,
further comprising removing the second moulding tool unit from the moulding cavity and/or with a step of introducing the third moulding tool unit into the moulding cavity, so that the third moulding tool unit faces the first moulding tool unit.

4. The method in accordance with claim 1,
further comprising preheating the blank before pressure moulding the blank.

5. The method in accordance with claim 1,
further comprising preheating the laminating film before the bonding of the moulded part with the laminating film.

6. The method in accordance with claim 1,
further comprising injecting reinforcing elements onto the moulded part in the moulding cavity.

7. The method in accordance with claim 1,
wherein the steps are performed, at least in part, with a computer device.

* * * * *